Oct. 9, 1934.  J. BECH  1,975,917
CONVEYER
Filed April 4, 1932  2 Sheets-Sheet 2
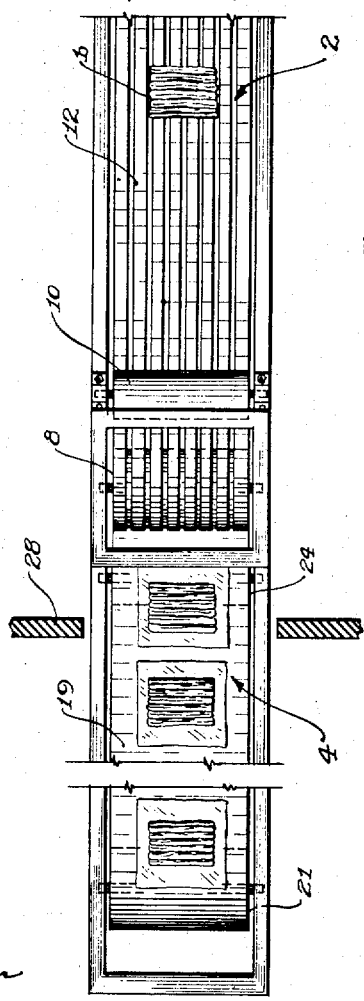
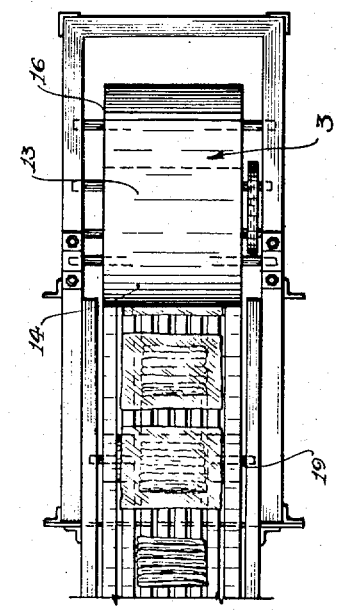
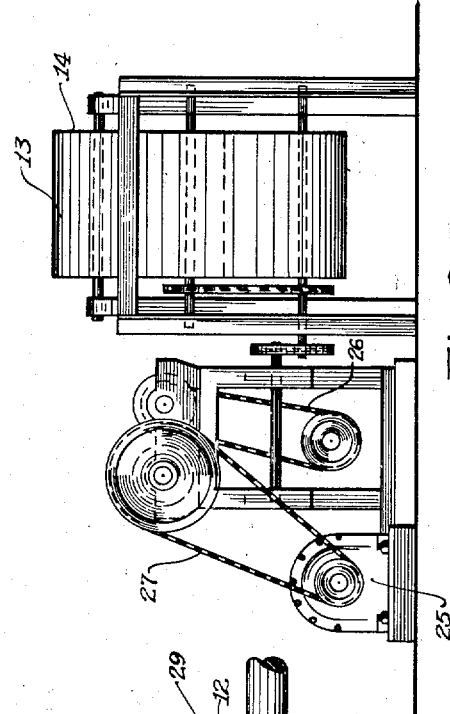
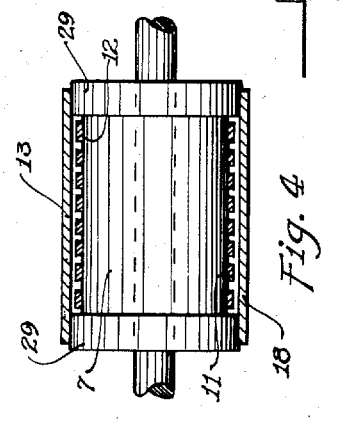
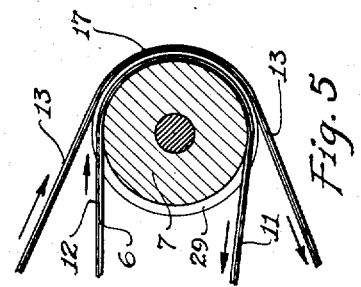
Joseph Bech
INVENTOR Patented Oct. 9, 1934

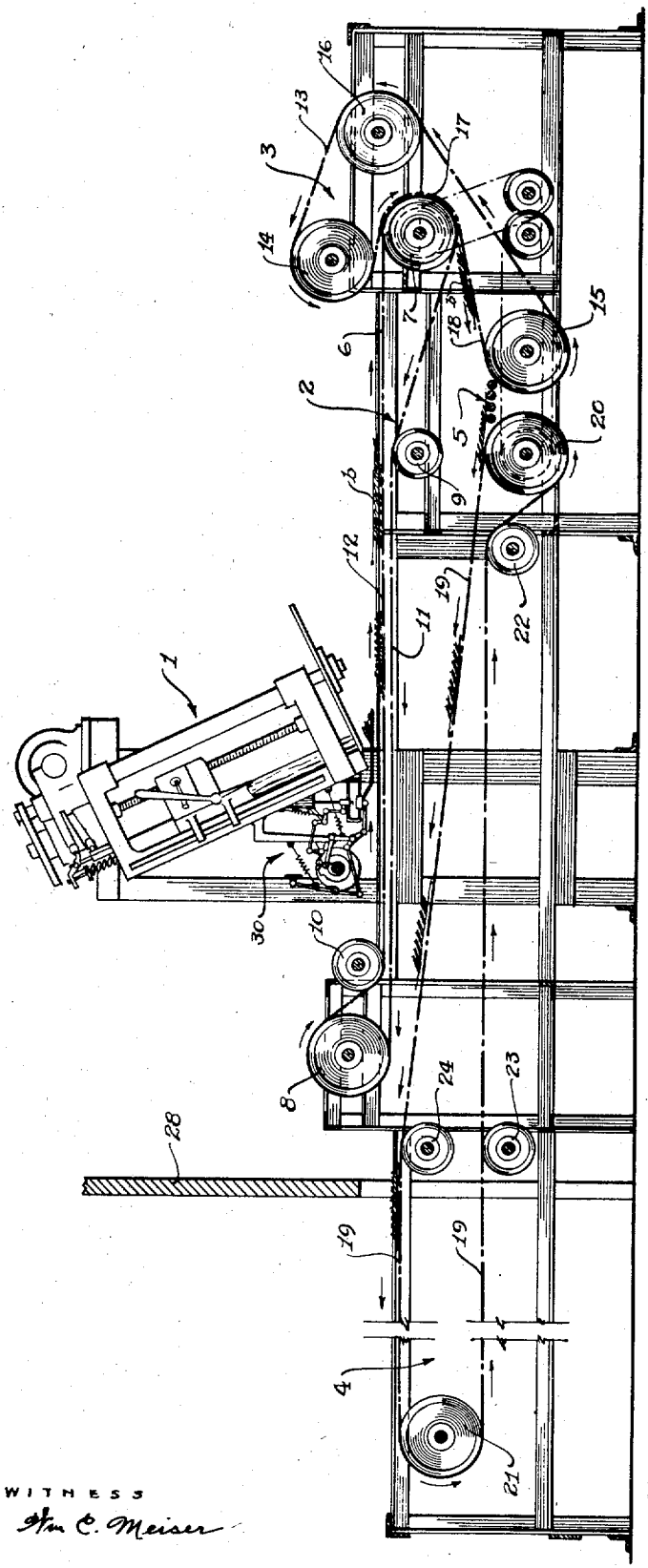

1,975,917

UNITED STATES PATENT OFFICE 1,975,917

CONVEYER

Joseph Bech, Chicago, Ill., assignor to Swift and Company, Chicago, Ill., a corporation of Illinois Application April 4, 1932, Serial No. 602,960

2 Claims. (Cl. 146—94)

The invention, according to one aspect thereof, relates to a food slicing machine, and particularly to a bacon slicing machine, having a conveying system associated therewith and arranged so as to receive slices of bacon thereon as delivered from the slicing machine, preferably in spaced group or batch arrangement, and which conveying system is constructed so that a sheet or sheets of wrapping material, such as paper, can be placed upon or applied to the top of the bacon slices or to the top of each group or batch of bacon slices and so that the paper and bacon slices can be automatically inverted and passed to a final receiving or delivering conveyer upon which the assembled batches of bacon can each be inspected preparatory to completing the wrapping operation.

The invention according to another aspect thereof relates to such a conveyer system constructed and arranged so as to receive batches of bacon and to thereafter invert and convey the same regardless as to whether paper for wrapping has been placed thereupon.

The invention according to another aspect thereof relates to the employment with a receiving and conveying mechanism of means for pressing slices of bacon when in a bundle or group arrangement on the conveying mechanism so that there is effected a welding or relatively firm sticking together of the several layers or slices in and constituting the group.

The invention according to another aspect thereof relates to the arrangement of different sets of conveying mechanisms and pressing instrumentalities associated therewith, whereby when the bundles of bacon thereupon are conveyed along and passed from one conveying mechanism to another the batches are pressed and are inverted either simultaneously with the pressing or shortly thereafter, preparatory to feeding the group to the delivery portion of the apparatus.

The invention according to more specific aspects thereof relates to and comprises the bringing into operative relation at the forward or delivery end of an initial receiving endless conveyer, of a final endless conveyer and the supplying between the two conveyers and operatively associated with them, of an inverting mechanism, more specifically an inverting endless conveyer that is relied upon for deflecting and inverting groups of bacon as they pass from the initial receiving endless conveyer, and for delivering the groups while still inverted to the final delivering endless conveyer.

The invention according to another aspect thereof relates to a method which comprises the assembling of slices in groups, the applying of a wrapping paper to the top of each group, the inverting of each assembled paper and group and the completing of the wrapping after inspection of the inverted group. The applying of a paper to the top of each group also permits an advantageous pressing together of the slices of each group by pressure exerted to and through the paper.

With these and other objects in view, the invention consists in the novel method, construction, combination and arrangement of parts hereinafter fully described, illustrated in the accompanying drawings, and pointed out in the claims hereto appended, it being understood that various changes in the form, proportion, and minor details of construction, within the scope of the claims, may be resorted to without departing from the spirit or sacrificing any of the advantages of the invention.

As illustrating a specific manner in which the invention may be realized, and specific apparatus for realizing the invention, reference is made to the accompanying drawings, forming a part of the application, and in which drawings:

Figure 1 is a vertical longitudinal diagrammatic view showing a downwardly and forwardly inclined bacon slicing machine and in association therewith a conveying system arranged to receive sliced bacon delivered thereto from the slicing machine.

Fig. 2 is a vertical view of the conveying system, looking rearwardly at the front end of the machine.

Fig. 3 is a plan view of the conveying system.

Fig. 4 is a side view of pulley element 7.

Fig. 5 is a cross-sectional view of pulley element 7.

Referring now specifically to the drawings, the slicing machine is designated by the numeral 1. The slicing machine shown is of the type shown and described in the co-pending application of Charles T. Walter, Serial No. 543,499, filed June 11, 1931, although it will be understood that according to many aspects of the invention, any type of slicing machine can be employed with the conveying system of the present invention. The conveying system and the slicing machine are constructed and arranged so as to operate in conjunction with each other, so that the individual slices as delivered to the conveying system will be delivered so that the slices are arranged in group formation with gaps between the groups, and with the slices in each group arranged on or in overlapping relation in respect to each other. This arrangement and spacing may be effected in any suitable manner, as by incorporating in the slicing machine any suitable desired mechanism for accomplishing that end, or by operative driving arrangement between the slicing machine on the one hand and the conveying system on the other.

The conveying system shown comprises three sets of mechanisms, which may be referred to as an initial receiving conveying mechanism 2, an inverting mechanism 3, and a final receiving inverting mechanism 3, and a final receiving and/or delivering mechanism 4. Between the delivery end of the inverting mechanism 3 and the forward receiving end of the mechanism 4, there is provided a set of driven rollers 5, which bridge the gap between said inverting mechanism 3 on the one hand and the final receiving mechanism 4 on the other. From certain points of view, however, these driven rollers 5 may broadly be considered as part of the final receiving mechanism.

The initial receiving mechanism 2 comprises an endless conveyer or conveyer element 6, sometimes herein referred to as the initial receiving endless conveyer. This conveyer element 6 passes over a forward pulley element 7 and a rear pulley element 8. In the construction shown there are employed idler or guide pulley elements 9 and 10 which cause the major portions of the chords or lobes 11 and 12 of the endless conveyer to be arranged in proximate relation in respect to each other. The upper chord 12 has a relatively straight section that moves forwardly and longitudinally towards and thence about the forward pulley element 7 of the initial receiving endless conveyer.

The inverting mechanism 3 in the arrangement shown includes an endless conveyer 13, sometimes herein referred to as the inverting endless conveyer. This conveyer 13 moves upon upper, lower and forward pulley elements 14, 15, 16 and 7, respectively. Flanges 29 are provided on pulley element 7, the depth of the flanges depending upon the thickness of the material being packed. The conveyer 13 extends from the upper pulley element 14, thence forwardly and downwardly about the forward end of the initial receiving endless conveyer 6, thence rearwardly and downwardly towards and around the lower pulley element 15, therefrom upwardly and forwardly to and around the front pulley element 16 and finally back to the pulley element 14. An inspection of Figure 1 will make it clear that portion 17 of the inverting conveyer element, which is adjacent to the forward end of the initial receiving conveyer 6, may be referred to as a portion which is at and adjacent to the front end of said initial receiving endless conveyer, and that the inverting endless conveyer also provides a section 18 which extends rearwardly and downwardly. As a matter of fact, in the construction shown, the endless inverting conveyer is preferably arranged so as to either press against the forward section of the initial receiving conveyer as it passes around the front pulley element, or against a batch of bacon, b, or other material, as it passes from the top lobe of the receiving conveyer. The form and construction of this inverting mechanism, according to the broader aspects of the invention, may be changed and modified, it being important, however, that the inverting mechanism have a portion, as 17, which is arranged at and adjacent to the forward delivery portion of the receiving conveyer, and a portion, as 18, which extends downwardly and rearwardly therefrom, whereby material delivered from the receiving conveyer is inverted prior to delivery from the inverting mechanism.

The final receiving conveyer, which may also be referred to as a delivering conveyer, has an endless conveyer 19 which is herein frequently referred to as the final receiving endless conveyer. This conveyer travels over forward pulley element 20 and rear pulley element 21. It is also supported to a certain extent by idlers or guide pulleys 22, 23 and 24. As previously indicated, the driven rollers 5 bridge the space at the delivery end of the inverting mechanism and the receiving end of the final delivering section, and these driven rollers may be considered, according to the broader aspects of the invention, as functioning with and as a part of either of these mechanisms.

The conveying system as a whole is driven from a motor 25 through any suitable means, as 26, comprising belts, chains and/or gears, and which means 26 is driven from the main motor, as through the medium of the belt or other suitable driving mechanism 27. This mechanism 26 may be provided with a change gear arrangement to regulate the speed, if a constant speed motor is employed. It will be manifest from an inspection of Figures 1 and 2 that the initial receiving endless conveyer, the inverting mechanism, and the final receiving conveyer, including the spaced driven rollers 5, are all simultaneously driven from the common source of power, to wit, the motor 25.

In Figure 1 there is indicated a partition, as 28, that separates what may be termed the slicing room from the wrapping room. It will also be obvious that the receiving and delivering conveyer extends a substantial distance in the rear of the initial receiving endless conveyer, whereby the bacon or other material can be delivered into the wrapping room. As a matter of fact, the initial receiving conveyer and the final delivering endless conveyer may be considered as part of an initial receiving table and as part of a final receiving or wrapping table. The foregoing description particularly applies to the apparatus or system arrangements. It will now be pointed out that the upper straight lobe section 12 of the initial receiving conveyer is relatively long and thereby provides a space to permit inspection of the bacon delivered thereto. It also provides a space whereat sheets of wrapping material, either wrapping paper in sheet form or other wrapping material, is or can be placed upon the groups or batches of bacon slices b as they pass forwardly and longitudinally along on the conveyer. As these assembled wrappings and batches of bacon successively pass to the inverting mechanism, pressure is imparted through the paper to the bacon slices which are on or overlap each other, in a manner to "weld" or thoroughly stick together the bacon slices in engagement with each other. As the assembled paper and bacon passes along the inverting mechanism, the assembled batch is inverted, so that the paper is at the bottom and the pressed together slices of bacon are at the top. It will be manifest that this assembled batch can readily pass from the delivery end of the inverting mechanism to and upon the receiving end of the final delivery mechanism, and that these assembled batches pass along and ultimately reach a place where they can be inspected and the wrapping completed, as for instance in the wrapping room. Of course, the slicing machine and the conveying system are suitable supported on frames, but it is believed that it is not necessary to incorporate herein a specific description of the frame structure.

The gap forming means 30, shown in Figure 1 is described and claimed in my co-pending application, filed June 23, 1932, Serial No. 618,884.

What is claimed is:

1. In combination with a slicing machine a conveying system arranged to receive slices of bacon as delivered from the machine, which slicing machine has associated therewith any suitable mechanism for causing the individual slices to be delivered in overlapping relationship but so as to form gaps between groups of overlapping slices; said conveying system comprising an initial receiving table mechanism, an inverting guide mechanism, a final receiving table mechanism, and a set of driven rollers bridging a gap between the inverting guiding mechanism on the one hand and the final receiving table mechanism on the other; said initial receiving table mechanism having as an essential part thereof an initial receiving endless conveyer which passes over front and rear pulley elements therefor, so as to provide an upper forwardly moving receiving lobe that passes to and downwardly about said front pulley element; said inverting mechanism comprising an inverting endless conveyer which is arranged in operative association with the forward end of the initial receiving endless conveyer and which inverting endless conveyer passes successively over lower, front and upper pulley elements therefor, whereby said endless guiding conveyer passes from the upper pulley therefor, thence forwardly and downwardly and to and in engagement with the forward curved portion of the initial receiving endless conveyer or in contact with the material then being conveyed and located at that portion of the initial receiving endless conveyer, whereby pressing and welding individual slices together, thence downwardly and rearwardly around the lower pulley element of the inverting endless conveyer, thence forwardly and upwardly to the front pulley element for said inverting endless conveyer, and finally back to the upper pulley element for said inverting endless conveyer; said final receiving table mechanism having an endless conveying element which passes over front and rear pulley elements therefor and which operates so as to provide a movable upper lobe of the conveyer that travels from the front pulley element therefor rearwardly to the rear pulley element therefor, the space between said lower pulley element of the inverting guide mechanism and front pulley element of the endless conveyer of the final receiving table mechanism being bridged by said set of driven rollers.

2. A receiving and conveying mechanism for use in conjunction with food slicing machines, which conveying mechanism comprises an initial receiving endless conveyer mounted upon rear and forward pulley elements arranged with a horizontally extending top receiving section movable forwardly towards and downwardly over the forward pulley element, an inverting means comprising an endless belt mounted upon pulley elements and operatively associated with the forward end of the initial receiving endless conveyer, which continuous endless inverting belt has a section that moves downwardly and along the forward section of the initial receiving endless conveyer or in engagement with the material on the initial receiving endless conveyer and thence downwardly and rearwardly to a place whereat the inverted material leaves the inverting means, a final receiving and delivering conveyer mounted upon pulley elements and spaced from the inverting means to receive and ultimately deliver the inverted material as passed thereto, and means comprising rotatably mounted driven rollers for bridging the space between the inverting means and the final receiving and delivering conveyer and which rollers provide means whereby the sliced material passes from the inverting means towards and upon the final receiving and delivering conveyer.

JOSEPH BECH.

CERTIFICATE OF CORRECTION.

Patent No. 1,975,917.      October 9, 1934.

JOSEPH BECH.

It is hereby certified that error appears in the printed specification of the above numbered patent requiring correction as follows: Page 3, line 41, claim 1, for the word "whereby" read thereby; and that the said Letters Patent should be read with this correction therein that the same may conform to the record of the case in the Patent Office.

Signed and sealed this 30th day of October, A. D. 1934.

(Seal)      Leslie Frazer
Acting Commissioner of Patents.

the slicing machine and the conveying system are suitable supported on frames, but it is believed that it is not necessary to incorporate herein a specific description of the frame structure.

The gap forming means 30, shown in Figure 1 is described and claimed in my co-pending application, filed June 23, 1932, Serial No. 618,884.

What is claimed is:

1. In combination with a slicing machine a conveying system arranged to receive slices of bacon as delivered from the machine, which slicing machine has associated therewith any suitable mechanism for causing the individual slices to be delivered in overlapping relationship but so as to form gaps between groups of overlapping slices; said conveying system comprising an initial receiving table mechanism, an inverting guide mechanism, a final receiving table mechanism, and a set of driven rollers bridging a gap between the inverting guiding mechanism on the one hand and the final receiving table mechanism on the other; said initial receiving table mechanism having as an essential part thereof an initial receiving endless conveyer which passes over front and rear pulley elements therefor, so as to provide an upper forwardly moving receiving lobe that passes to and downwardly about said front pulley element; said inverting mechanism comprising an inverting endless conveyer which is arranged in operative association with the forward end of the initial receiving endless conveyer and which inverting endless conveyer passes successively over lower, front and upper pulley elements therefor, whereby said endless guiding conveyer passes from the upper pulley therefor, thence forwardly and downwardly and to and in engagement with the forward curved portion of the initial receiving endless conveyer or in contact with the material then being conveyed and located at that portion of the initial receiving endless conveyer, whereby pressing and welding individual slices together, thence downwardly and rearwardly around the lower pulley element of the inverting endless conveyer, thence forwardly and upwardly to the front pulley element for said inverting endless conveyer, and finally back to the upper pulley element for said inverting endless conveyer; said final receiving table mechanism having an endless conveying element which passes over front and rear pulley elements therefor and which operates so as to provide a movable upper lobe of the conveyer that travels from the front pulley element therefor rearwardly to the rear pulley element therefor, the space between said lower pulley element of the inverting guide mechanism and front pulley element of the endless conveyer of the final receiving table mechanism being bridged by said set of driven rollers.

2. A receiving and conveying mechanism for use in conjunction with food slicing machines, which conveying mechanism comprises an initial receiving endless conveyer mounted upon rear and forward pulley elements arranged with a horizontally extending top receiving section movable forwardly towards and downwardly over the forward pulley element, an inverting means comprising an endless belt mounted upon pulley elements and operatively associated with the forward end of the initial receiving endless conveyer, which continuous endless inverting belt has a section that moves downwardly and along the forward section of the initial receiving endless conveyer or in engagement with the material on the initial receiving endless conveyer and thence downwardly and rearwardly to a place whereat the inverted material leaves the inverting means, a final receiving and delivering conveyer mounted upon pulley elements and spaced from the inverting means to receive and ultimately deliver the inverted material as passed thereto, and means comprising rotatably mounted driven rollers for bridging the space between the inverting means and the final receiving and delivering conveyer and which rollers provide means whereby the sliced material passes from the inverting means towards and upon the final receiving and delivering conveyer.

JOSEPH BECH.

CERTIFICATE OF CORRECTION.

Patent No. 1,975,917.  October 9, 1934.

JOSEPH BECH.

It is hereby certified that error appears in the printed specification of the above numbered patent requiring correction as follows: Page 3, line 41, claim 1, for the word "whereby" read thereby; and that the said Letters Patent should be read with this correction therein that the same may conform to the record of the case in the Patent Office.

Signed and sealed this 30th day of October, A. D. 1934.

(Seal)

Leslie Frazer
Acting Commissioner of Patents.